United States Patent
Go et al.

(10) Patent No.: US 10,276,113 B2
(45) Date of Patent: Apr. 30, 2019

(54) DISPLAY DEVICE

(71) Applicant: SAMSUNG DISPLAY CO., LTD., Yongin, Gyeonggi-Do (KR)

(72) Inventors: Jeonghun Go, Asan-si (KR); Hyochul Lee, Cheonan-si (KR); Onsik Choi, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 447 days.

(21) Appl. No.: 14/836,186

(22) Filed: Aug. 26, 2015

(65) Prior Publication Data
US 2016/0180756 A1     Jun. 23, 2016

(30) Foreign Application Priority Data

Dec. 18, 2014 (KR) .................. 10-2014-0183387

(51) Int. Cl.
*G09G 3/12* (2006.01)
*G09G 3/36* (2006.01)
*G02F 1/1345* (2006.01)

(52) U.S. Cl.
CPC ....... *G09G 3/3648* (2013.01); *G02F 1/13452* (2013.01); *G09G 2300/0426* (2013.01)

(58) Field of Classification Search
CPC .................................. G09G 3/12; G09G 3/18
USPC ...................................................... 174/260
See application file for complete search history.

(56) References Cited

U.S. PATENT DOCUMENTS

| | | | |
|---|---|---|---|
| 6,734,941 B2 | 5/2004 | Yamazaki et al. | |
| 9,218,757 B2 | 12/2015 | Min et al. | |
| 2009/0107714 A1* | 4/2009 | Ogasawara | H05K 1/0271 174/260 |
| 2010/0073908 A1* | 3/2010 | Bae | G02F 1/133604 362/97.1 |
| 2012/0146520 A1* | 6/2012 | Liu | G09G 3/3406 315/192 |
| 2013/0335923 A1 | 12/2013 | Zhang et al. | |
| 2014/0028535 A1* | 1/2014 | Min | G09G 3/18 345/87 |

(Continued)

FOREIGN PATENT DOCUMENTS

| | | |
|---|---|---|
| CN | 1434330 | 8/2003 |
| CN | 103578439 | 2/2014 |
| KR | 1020050122810 | 12/2005 |

(Continued)

OTHER PUBLICATIONS

Chinese Office Action issued in corresponding application No. 201510954537.6 dated Jan. 28, 2019.

*Primary Examiner* — Stanley Tso
(74) *Attorney, Agent, or Firm* — F. Chau & Associates, LLC

(57) ABSTRACT

A display device including: a display panel; a printed circuit board (PCB) including a first substrate and a second substrate; a driving circuit disposed on the first substrate; a carrier connected between the display panel and a pad of the PCB and having a data driving integrated circuit mounted thereon; a protrusion corresponding to the pad and protruding from a side of the second substrate; and a signal line disposed in the protrusion, the first substrate, and the second substrate, the signal line for transmitting a signal from the driving circuit to the carrier.

16 Claims, 7 Drawing Sheets

(56) References Cited

U.S. PATENT DOCUMENTS

2017/0064827 A1* 3/2017 Park .................... H01R 12/721

FOREIGN PATENT DOCUMENTS

| KR | 1020120136669 | 12/2012 |
| KR | 1020130131909 | 12/2013 |

* cited by examiner

DISPLAY DEVICE

CROSS-REFERENCE TO RELATED APPLICATION

This application claims priority under 35 U.S.C. § 119 to Korean Patent Application No. 10-2014-0183387, filed on Dec. 18, 2014 in the Korean Intellectual Property Office, the disclosure of which is incorporated by reference herein in its entirety.

TECHNICAL FIELD

Exemplary embodiments of the present invention relate to a display device.

DISCUSSION OF THE RELATED ART

In general, a flat panel display (FPD) device such as a liquid crystal display (LCD) device or an organic light emitting diode (OLED) device may include a plurality of pairs of electric field generating electrodes and electro-optical active layers. The electro-optical active layers may each be included between a pair of the electric field generating electrodes. An LCD device may include a liquid crystal layer as an electro-optical active layer, and an OLED device may include an organic light emitting layer as an electro-optical active layer.

One of a pair of the electric field generating electrodes may be connected to a switching element to receive an electrical signal applied to the switching element, and the electro-optical active layer may convert the electrical signal into an optical signal to display an image.

Such an FPD device may include a source printed circuit board (PCB) on which a driving circuit for processing an image data signal is mounted.

Since a source PCB is manufactured on a single mother board, a plurality of source PCBs may be simultaneously manufactured on a single mother board. Through a subsequent cutting process, the source PCBs are individually separated from the mother board. Manufacturing costs may be reduced by manufacturing as many source PCBs as possible from a single mother board.

SUMMARY

Exemplary embodiments of the present invention provide a display device with a source printed circuit board (PCB) having a changed structure.

According to an exemplary embodiment of the present invention, a display device includes: a display panel; a PCB including a first substrate and a second substrate; a driving circuit disposed on the first substrate; a carrier connected between the display panel and a pad of the PCB and having a data driving integrated circuit mounted thereon; a protrusion corresponding to the pad and protruding from a side of the second substrate; and a signal line disposed at the protrusion, the first substrate, and the second substrate, the signal line for transmitting a signal from the driving circuit to the carrier.

The first substrate may have a groove having a shape substantially the same as a shape of the protrusion.

A distance from a first end of the PCB to the protrusion may be substantially the same as a distance from a second end of the PCB to the groove.

The first and second substrates may include the same number of pads.

The display device may further include a connecting line for connecting the signal line and the pad to one another.

A portion of the connecting line is disposed at the protrusion.

The signal line may include a plurality of signal lines, and an interval between signal lines disposed at a portion of the PCB between the pad and the protrusion is greater than an interval between signal lines disposed at a portion of the PCB other than the portion of the PCB between the pad and the protrusion.

The first substrate may have an area greater than an area of the second substrate.

The first substrate may have a length substantially the same as a length of the second substrate.

The driving circuit may include a timing controller and a direct current (DC)-DC converter.

According to an exemplary embodiment of the present invention, a PCB includes: a plurality of pads disposed on a first side of the PCB; a plurality of protrusions and grooves disposed on a second side of the PCB, the second side of the PCB being opposite to the first side of the PCB; and a data driving circuit disposed on the PCB, wherein a first protrusion of the plurality of protrusions is disposed opposite to a first pad of the plurality of pads, a plurality of signal lines is formed in a first area between the first protrusion and the first pad, and the plurality of signal lines extends from the first area into a second area of the PCB where the first protrusion and the first pad are not located, wherein a distance between adjacent signal lines in the first area is greater than a distance between adjacent signal lines in the second area.

The signal lines in the first area may be connected to the first pad via connection lines.

The plurality of signal lines may be connected to the data driving circuit.

The data driving circuit may include a timing controller and a DC-DC converter.

According to an exemplary embodiment of the present invention, a motherboard includes: a first PCB, the first PCB including: a plurality of pads disposed on a first side of the first PCB; and a plurality of protrusions and grooves disposed on a second side of the first PCB, the second side of the first PCB being opposite to the first side of the first PCB, wherein a first protrusion of the plurality of protrusions is disposed opposite to a first pad of the plurality of pads, a plurality of signal lines is formed in a first area between the first protrusion and the first pad, and the plurality of signal lines extends from the first area into a second area of the first PCB where the first protrusion and the first pad are not located, wherein a distance between adjacent signal lines in the first area is greater than a distance between adjacent signal lines in the second area.

The motherboard may further include: a second PCB, the second PCB including: a plurality of pads disposed on a first side of the second PCB; and a plurality of protrusions and grooves disposed on a second side of the second PCB, wherein the second side of the second PCB is adjacent to the second side of the first PCB, the protrusions of the first PCB correspond to the grooves of the second PCB, and the protrusions of the second PCB correspond to the grooves of the first PCB.

The first and second PCBs may each include a data driving circuit.

BRIEF DESCRIPTION OF THE DRAWINGS

The above and other features of the present invention will be more clearly understood by describing in detail exemplary embodiments thereof with reference to the accompanying drawings, in which.

DETAILED DESCRIPTION OF THE EMBODIMENTS

Figure 1:
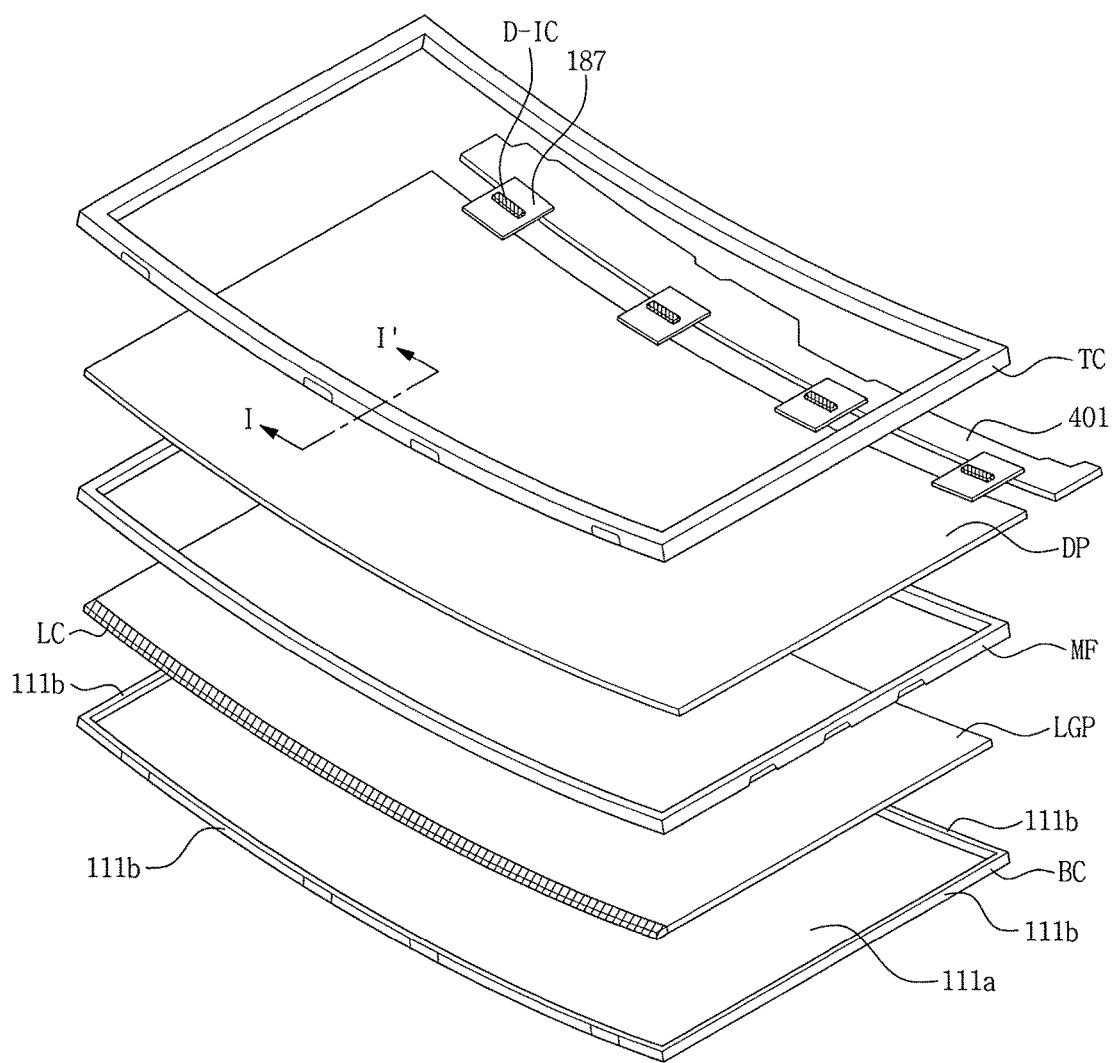
FIG. 1 is an exploded perspective view illustrating a display device according to an exemplary embodiment of the present invention.

Hereinafter, exemplary embodiments of the present invention will be described more fully with reference to the accompanying drawings. The present invention may, however, be embodied in many different forms and should not be construed as being limited to the embodiments set forth herein. Like reference numerals may refer to like elements throughout the specification.

In the drawings, thicknesses may be illustrated in an enlarged manner to clearly describe certain layers and areas. When an element or layer is referred to as being "on" another element or layer, it may be directly on the other element or layer, or intervening elements or layers may be present.

Hereinafter, a display device according to an exemplary embodiment of the present invention will be described with reference to FIGS. 1 through 7.

Figure 2:
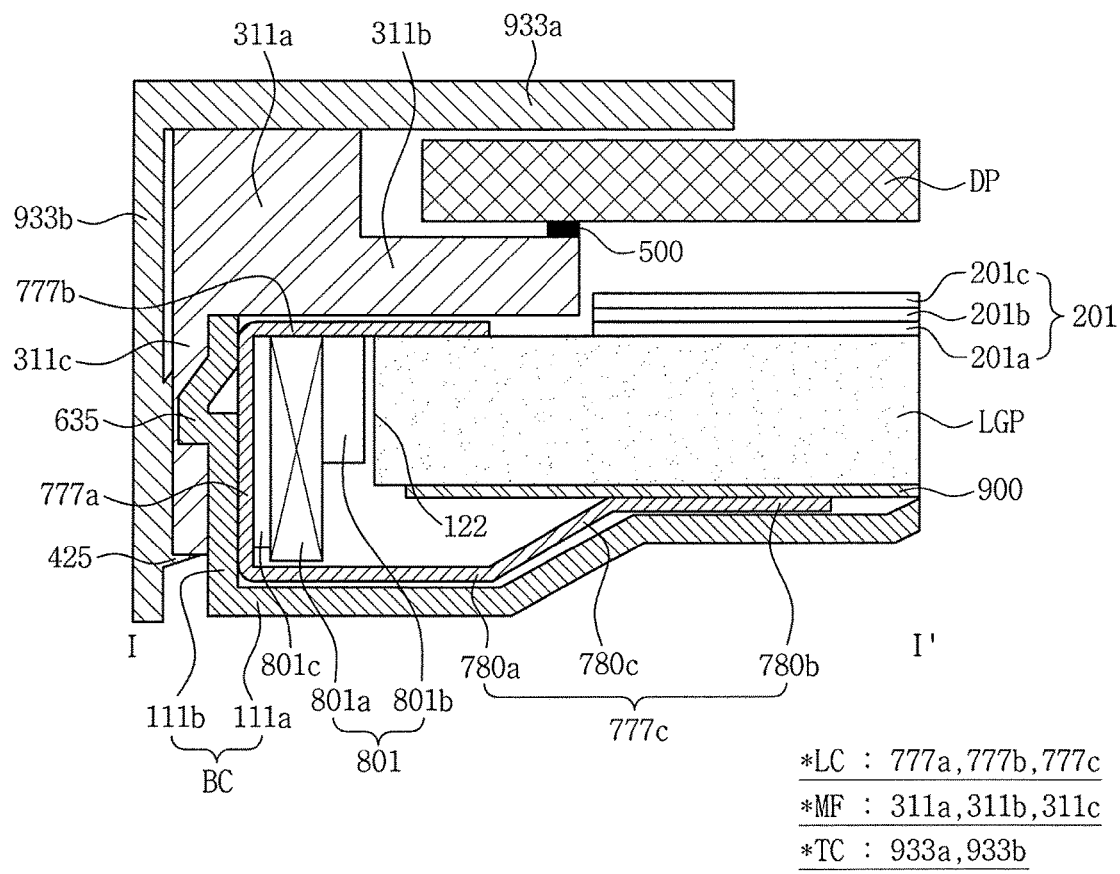
FIG. 2 is a cross-sectional view taken along line I-I' of FIG. 1, according to an exemplary embodiment of the present invention.

FIG. 1 is an exploded perspective view illustrating a display device according to an exemplary embodiment of the present invention; and FIG. 2 is a cross-sectional view taken along line I-I' of FIG. 1, according to an exemplary embodiment of the present invention.

Referring to FIGS. 1 and 2, a display device according to an exemplary embodiment of the present invention may include a bottom case BC, a reflective plate 900, a light guide plate LGP, an optical sheet 201, a light source module 801, a light source cover LC, a mold frame MF, a display panel DP, and a top case TC. Here, the reflective plate 900, the light guide plate LGP, the optical sheet 201, the light source module 801, the light source cover LC, and the mold frame MF may be included in a backlight unit. In addition, the display panel DP and the backlight unit may be assembled to be in a stacked state to configure a display module. Such a display module may further include the top case TC and the bottom case BC for protecting and fixing the display panel DP and the backlight unit, and a driving circuit board for driving the display panel DP.

The bottom case BC may include an accommodating space therein. The reflective plate 900, the light guide plate LGP, the optical sheet 201, the light source module 801, and the light source cover LC may be disposed in the accommodating space of the bottom case BC. To provide a secure accommodating space, the bottom case BC may include a bottom portion 111a and a plurality of side portions 111b. For example, the bottom portion 111a may have a quadrangular shape, and the plurality of side portions 111b may protrude to have predetermined heights from edges of the bottom portion 111a, respectively. Edges of adjacent side portions 111b may be connected to one another. A space enclosed by the side portions 111b and the bottom portion 111a may correspond to the accommodating space of the bottom case BC described above. In addition, catching ledges 635 may be formed outwardly from side portions 111b facing one another, respectively, and the mold frame MF may be fixed to the bottom case BC by the catching ledges 635. The catching ledge 635 may be formed by bending a portion of a corresponding side portion 111b to protrude toward the mold frame MF.

The light source module 801 may be an element for generating light, and as illustrated in FIG. 2, may include a light source printed circuit board (PCB) 801a and one or more light sources 801b.

A surface of the light source PCB 801a may be divided into one or more mounting regions and a wiring region. In a case of two or more light sources, a single light source among the two or more light sources may be installed in each of the mounting regions, and a plurality of wirings for transmitting driving power to the two or more light sources may be installed in the wiring region. The aforementioned driving power may be generated in an external power supplier, and may be supplied to the plurality of wirings through an additional connector.

The light source 801b may emit light, and may be installed in the light source PCB 801a. The light source 801b may be a light emitting package including at least one light emitting diode (LED). For example, a single light emitting package may include a red LED for emitting red light, a green LED for emitting green light, and a blue LED for emitting blue light. The light emitting package may generate white light through a combination of three types of colors. As a further example, the light emitting package may only include the blue LED, and in this case, a phosphor for converting blue light into white light may be formed in a light emitting portion of the blue LED. Light emitted from the light source 801b may be incident on the light guide plate LGP.

As illustrated in FIGS. 1 and 2, the light guide plate LGP may have a polyhedral shape. One of a plurality of surfaces included in the light guide plate LGP facing the light source 801b may be a light-incident surface 122. Light emitted from the light source 801b may be incident on the light-incident surface 122, and may travel into the light guide plate LGP. The light guide plate LGP may perform total reflection of the light travelling thereinto to guide the light toward a display region of the display panel DP. To enhance reflectivity of the light guide plate LGP, a plurality of dispersion patterns may further be installed on a lower outer surface of the light guide plate LGP. In this case, the dispersion patterns may be disposed to have an interval therebetween increasing as they are spaced apart from the light incident surface 122 of the light guide plate LGP.

The light guide plate LGP may be formed of a light-transmissive material, for example, an acrylic resin such as polymethyl methacrylate (PMMA) or polycarbonate (PC) to guide light efficiently.

The reflective plate 900 may be provided below the light guide plate LGP. The reflective plate 900 may minimize a light loss rate by re-reflecting light leaking from the lower outer surface of the light guide plate LGP and redirecting the re-reflected light toward the light guide plate LGP.

The optical sheet 201 may diffuse and converge light transferred from the light guide plate LGP, and as illustrated in FIGS. 1 and 2, may be disposed between the light guide plate LGP and the display panel DP. The optical sheet 201 may include a diffusion sheet 201a, a condensing sheet 201b, and a protective sheet 201c. The diffusion sheet 201a, the condensing sheet 201b, and the protective sheet 201c may be sequentially stacked on the light guide plate LGP.

The diffusion sheet 201a may prevent partial concentration of light by dispersing light transferred from the light guide plate LGP.

The condensing sheet 201b may be disposed on the diffusion sheet 201a to condense light diffused from the diffusion sheet 201a in a direction perpendicular with respect to the display panel DP. For example, prisms having a triangular prism shape may be disposed on a surface of the condensing sheet 201b while having a predetermined array.

The protective sheet 201c may be disposed on the condensing sheet 201b to protect a surface of the condensing sheet 201b, and may provide uniform distribution of light by diffusing the light. Light having passed through the protective sheet 201c may be provided to the display panel DP.

As illustrated in FIG. 2, the light source cover LC may surround an edge portion of the light guide plate LGP to include the light source module 801 and the light-incident surface 122 within an accommodating space of the light source cover LC. The light source cover LC may align the light-incident surface 122 and the light sources 801b such that light from the light sources 801b may be precisely incident on the light-incident surface 122.

The light source cover LC may be formed of a metal material, for example, a stainless steel material.

The light source cover LC may include a light source installation portion 777a, an upper cover 777b, and a lower cover 777c.

The upper cover 777b may extend from one side of the light source installation portion 777a toward an upper outer surface of the light guide plate LGP.

The lower cover 777c may extend from the other side of the light source installation portion 777a toward the lower outer surface of the light guide plate LGP. The lower cover 777c may have various shapes depending on a shape of the bottom portion 111a of the bottom case BC. For example, as illustrated in FIG. 2, the lower cover 777c may include a first horizontal portion 780a extending from the other side of the light source installation portion 777a to have a predetermined length, a second horizontal portion 780b adjacent to the lower outer surface of the light guide plate LGP, and an inclined portion 780c connecting the first and second horizontal portions 780a and 780b to one another. The second horizontal portion 780b is more adjacent to the lower outer surface of the light guide plate LGP than the first horizontal portion 780a.

The light source 801b and the light source PCB 801a may be disposed in an accommodating space enclosed by the light source installation portion 777a, the upper cover 777b, and the lower cover 777c. In this case, an adhesive member 801c may be provided on a surface of the light source PCB 801a and a surface of the light source installation portion 777a. The light source module 801 may be bonded to the light source installation portion 777a by the adhesive member 801c. The adhesive member 801c may be a double-sided tape.

The mold frame MF may support the display panel DP and the top case TC in a state of being fixed to the bottom case BC, and may maintain a predetermined interval between the display panel DP and the optical sheet 201. For example, the mold frame MF may have a quadrangular frame shape including a first support portion 311a, a second support portion 311b, and a fixing portion 311c.

The first support portion 311a may support the top case TC disposed thereon by being placed on the plurality of side portions 111b.

The second support portion 311b may extend toward the optical sheet 201 from an inner edge of the first support portion 311a. The second support portion 311b may have a height less than a height of the first support portion 311a. A space between the top case TC and the second support portion 311b may be formed due to a height difference between the second support portion 311b and the first support portion 311a, and an edge portion of the display panel DP may be positioned in the space between the top case TC and the second support portion 311b. Here, a buffer pad 500 protruding from an end portion of the second support portion 311b toward the display panel DP may be formed at the end portion of the second support portion 311b, and the edge portion of the display panel DP may be placed on the buffer pad 500. The buffer pad 500 may prevent direct contact between the display panel DP and the second support portion 311b, thereby avoiding scratches on the display panel DP.

The fixing portion 311c may extend from a lower surface of the first support portion 311a toward the side portion 111b. A coupling groove may be formed on one of surfaces of the fixing portion 311c facing the catching ledge 635. The catching ledge 635 may be engaged to the coupling groove such that the mold frame MF is fixed to the bottom case BC. For example, the coupling groove may be configured to receive the catching ledge 635.

The top case TC may have a quadrangular frame shape having an opening in a central portion thereof. The top case TC may be disposed above the display panel DP. A display region A1 of the display panel DP may be exposed through the opening of the top case TC. The top case TC may enclose the edge portion of the display panel DP, an upper surface and a side surface of the first support portion 311a and a side surface of the fixing portion 311c of the mold frame MF. For example, the top case TC may include a front cover 933a covering the edge portion of the display panel DP and the upper surface of the first support portion 311a, and a side cover 933b covering the side surface of the first support portion 311a and the side surface of the fixing portion 311c. In addition, a hook 425 may be formed on an inner portion of the side cover 933b, and the hook 425 may be in contact with a lower surface of the fixing portion 311c formed in the mold frame MF. Due to the hook 425, the top case TC may be fixed to the mold frame MF. In addition, one of the side covers 933b may have an opening. Through the opening of the side cover 933b, a source PCB 401 may be exposed outwardly from the top case TC. The source PCB 401 may be rotated on an axis of carriers 187 to face a bottom surface of the bottom cover BC.

The display panel DP may receive an image data signal from a system and light from the backlight unit to display an image. As illustrated in FIG. 1, the display panel DP may have a rectangular shape.

Hereinafter, the display panel of FIG. 1 will be described in further detail with reference to FIGS. 3 and 4.

Figure 3:
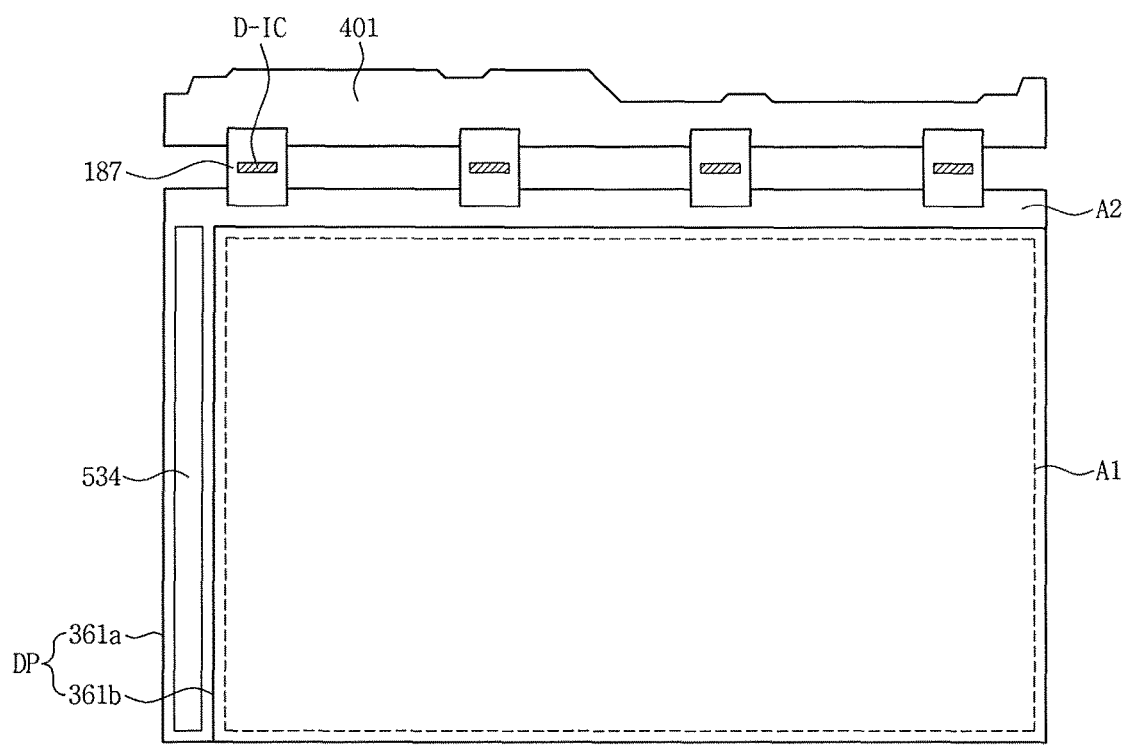
FIG. 3 is a detailed configuration view of a display panel of FIG. 1, according to an exemplary embodiment of the present invention.
Figure 4:
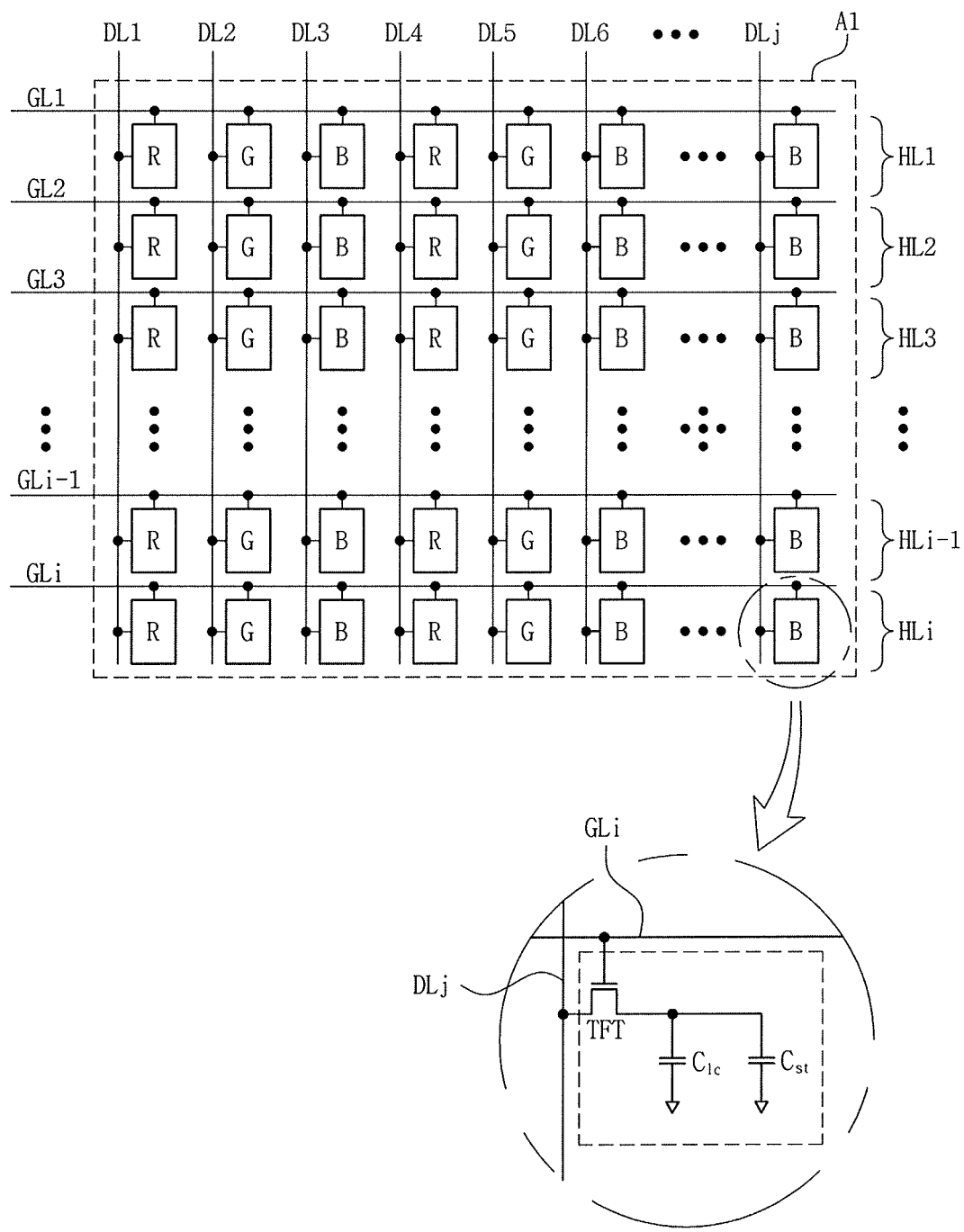
FIG. 4 is a view illustrating an array of pixels disposed in a display region of FIG. 3, according to an exemplary embodiment of the present invention.

FIG. 3 is a detailed configuration view of a display panel of FIG. 1, according to an exemplary embodiment of the present invention; and FIG. 4 is a view illustrating an array of pixels disposed in a display region of FIG. 3, according to an exemplary embodiment of the present invention.

Referring to FIG. 3, the display panel DP may include a lower substrate 361a and an upper substrate 361b facing one another while having a liquid crystal layer therebetween.

As illustrated in FIG. 3, the lower substrate 361a may be divided into a display region A1 and a non-display region A2. As illustrated in FIG. 4, a plurality of gate lines GL1 through GLi, a plurality of data lines DL1 through DLj intersecting the plurality of gate lines GL1 through GLi, and a plurality of pixels R, G, and B connected to the gate lines GL1 through GLi and the data lines DL1 through DLj may be arranged in the display region A1.

The upper substrate 361b may be disposed on the lower substrate 361a. The upper substrate 361b may have a size sufficiently large enough to cover at least the entirety of the display region A1 of the lower substrate 361a.

The upper and lower substrates 361b and 361a may each have a plurality of surfaces. For example, surfaces of the upper and lower substrates 361b and 361a facing one another while having the liquid crystal layer therebetween may be front surfaces of the upper and lower substrates 361b and 361a, respectively, and surfaces of the upper and lower substrates 361b and 361a disposed opposite to the front surfaces of the upper and lower substrates 361b and 361a may be rear surfaces of the upper and lower substrates 361b and 361a, respectively.

A black matrix, a plurality of color filters, and a common electrode may be disposed on the front surface of the upper substrate 361b.

The black matrix may be disposed on a portion of the front surface that does not correspond to pixel regions.

The color filters may be disposed in the pixel region. The color filters may be classified as red, green, and blue color filters.

The pixels R, G, and B may be arranged in the display region A1 in a form of a matrix. The pixels R, G, and B may be classified as red, green, and blue pixels R, G, and B disposed to correspond to the red, green, and blue color filters, respectively. In this case, horizontally adjacent red, green, and blue pixels R, G, and B may be a unit pixel for displaying a single unit image.

A j number of pixels arranged along an n-th horizontal line, n being one of 1 through i, hereinafter referred to as "n-th horizontal line pixels", may be connected to the first through j-th data lines DL1 through DLj, respectively. In addition, the n-th horizontal line pixels may be connected to a common n-th gate line. Accordingly, the n-th horizontal line pixels may each receive a common n-th gate signal. In other words, although a j number of pixels arranged along the same horizontal line all receive the same gate signals, pixels disposed on different horizontal lines may receive different gate signals from one another. For example, a red pixel R and a green pixel G disposed on a first horizontal line HL1 may receive first gate signals while a red pixel R and a green pixel G disposed on a second horizontal line HL2 may receive second gate signals having different timings from those of the first signals.

As illustrated in FIG. 4, each pixel may include a thin film transistor (TFT), a liquid crystal capacitor $C_{1c}$, and a storage capacitor $C_{st}$.

The TFT may be turned on based on a gate signal from the gate line GLi. The turned-on TFT may supply an analog image data signal supplied from the data line DLj to the liquid crystal capacitor $C_{1c}$ and the storage capacitor $C_{st}$.

The liquid crystal capacitor $C_{1c}$ may include a pixel electrode and a common electrode disposed to oppose one another.

The storage capacitor $C_{st}$ may include a pixel electrode and an opposing electrode disposed to oppose one another. Here, the opposing electrode may be a previous gate line or a common line for transmitting a common voltage.

A gate driver 534 may be disposed in the non-display region A2. For example, as illustrated in FIG. 3, the gate driver 534 may be disposed in a portion of the non-display region A2 adjacent to a left side edge of the display region A1.

The gate driver 534 may generate gate signals based on a gate control signal supplied from a timing controller, and may supply the gate signals to the plurality of gate lines GL1 through GLi in sequence from the first gate line GL1 to the last gate line GLi. The gate driver 534 may include, for example, a shift register for generating gate signals by shifting a gate start pulse based on a gate shift clock. The shift register may be configured of a plurality of switching elements. The switching elements may be formed on the front surface of the lower substrate 361a using a process similar to or the same as that used to form the TFT of the display region A1.

Data driving integrated circuits D-IC may receive digital image data signals and a data control signal from the timing controller. The data driving integrated, circuits D-IC may sample the digital image data signals based on the data control signal, may latch the sampled image data signals corresponding to a single horizontal line for each horizontal period, and may supply the latched image data signals to the data lines DL1 through DLj, respectively. In other words, the data driving integrated circuits D-IC may convert the digital image data signals from the timing controller into analog image data signals using a gamma voltage input from a power supply unit and supply the analog image data signals to the data lines DL1 through DLj, respectively.

As illustrated in FIG. 3, the data driving integrated circuits D-IC may be mounted on carriers 187, respectively.

The carrier may be manufactured in a form of a tape or a film.

The carriers 187 may electrically connect the source PCB 401 and the display panel DP to one another. For example, each of the carriers 187 may include a plurality of input terminals and a plurality of output terminals. The plurality of input terminals may be disposed in one side portion of the carrier 187, and the plurality of output terminals may be disposed in the other side portion of the carrier 187. The other side portion of the carrier 187 may be disposed opposite to the one side portion of the carrier 187.

The input terminals of each of the carriers 187 may be connected to a pad of the source PCB 401, and the output terminals of the carriers 187 may be connected to a pad of the display panel DP. The pad of the display panel DP may be disposed in the non-display region A2 of the display panel DP. The pad of the display panel DP may be connected to the data lines DL1 through DLj through link lines, respectively.

The input terminals of each of the carriers 187 and the pad of the source PCB 401 may be bonded to one another by an anisotropic conductive bonding film. In addition, the output terminals of each of the carriers 187 and the pad of the display panel DP may be bonded to one another by an anisotropic conductive bonding film.

The carriers 187 may be formed of a ductile material, which is bendable. For example, the carriers 187 may be manufactured of a polyimide (PI) having a relatively high coefficient of thermal expansion (CTE) and durability. In addition, the carriers 187 may be formed of a synthetic resin such as an acrylic, a polyether nitrile, a polyethersulphone (PES), a polyethyleneterephthalate (PET), or a polyethylenenaphthalate (PEN).

In addition, the display device according to the current embodiment may further include a timing controller and a direct current (DC)-DC converter. The timing controller and the DC-DC converter may be disposed on the source PCB 401.

The timing controller may receive a vertical synchronization signal, a horizontal synchronization signal, an image data signal, a clock signal, and driving power from an external system. In this instance, the vertical synchronization signal, the horizontal synchronization signal, the image data signal, the clock signal, and driving power may be input to the timing controller through an interface circuit. The interface circuit may include a low voltage differential signaling (LVDS) receiver. The interface circuit may reduce a voltage level of and increase a frequency of the vertical synchronization signal, the horizontal synchronization signal, the image data signal, the clock signal, and the driving power input from the external system.

The interface circuit may be embedded in the timing controller.

In addition, due to a high frequency component of a signal input from the interface circuit to the timing controller, electromagnetic interference may occur between the interface circuit and the timing controller, and thus, an electromagnetic interference (EMI) filter may be provided between the interface circuit and the timing controller to prevent such electromagnetic interference.

The timing controller may generate a gate control signal for controlling the gate driver 534 and a data control signal for controlling the data driving integrated circuits D-IC using the vertical synchronization signal, the horizontal synchronization signal, and the clock signal. The gate control signal may include a gate start pulse, a gate shift clock, a gate output enable signal, and the like. The data control signal may include a source start pulse, a source shift clock, a source output enable signal, a polarity signal, and the like.

In addition, the timing controller may rearrange the image data signals input from the external system, and may supply the rearranged image data signals to the data driving integrated circuits D-IC.

In addition, the aforementioned driving power may be used as a power voltage of a phase locked loop (PLL) in the timing controller. The PLL may compare the clock signal input to the timing controller and a reference frequency generated from an oscillator with one another. When there is a difference between the clock signal and the reference frequency as a result of the comparison, the PLL may generate a sampling clock signal by adjusting a frequency of the clock signal by the difference. The sampling clock signal may be a signal for sampling the image data signals.

The DC-DC converter may increase or decrease a level of a voltage of driving power input from the external system, and may generate voltages necessary for the display panel DP. For example, the DC-DC converter may include an output switching element for switching an output voltage of an output terminal and a pulse width modulator (PWM) for increasing or decreasing a level of the output voltage by controlling a duty ratio or a frequency of a control signal applied to a control terminal of the output switching element. Here, a pulse frequency modulator (PFM) may be included in the DC-DC converter in lieu of the aforementioned PWM.

The PWM may increase or decrease the level of the output voltage of the DC-DC converter by increasing or decreasing the duty ratio of the aforementioned control signal. The PFM may increase or decrease the level of the output voltage of the DC-DC converter by increasing or decreasing the frequency of the aforementioned control signal. The output voltage of the DC-DC converter may include a reference voltage having a level higher than 6 volts (V), a gamma reference voltage having levels less than 10, a common voltage having a level of from about 2.5 to about 3.3V, a gate high voltage having a level of about 15V or higher, and a gate low voltage having a level of about −4V or lower.

The gamma reference voltage may be a voltage generated by dividing the reference voltage. The reference voltage and the gamma reference voltage may be an analog gamma voltage, and may be supplied to the data driving integrated circuits D-IC. The common voltage may be supplied to the common voltage of the display panel DP via the data driving integrated circuit D-IC. The gate signal may have a high logic level higher than a level of a threshold voltage of the TFT to turn on the TFT, and the gate signal may have a low logic level lower than the level of the threshold voltage of the TFT to turn off the TFT. The gate high voltage and the gate low voltage may be supplied to the gate driver 534.

Hereinafter, the source PCB 401 will be described in further detail with reference to FIG. 5.

Figure 5:
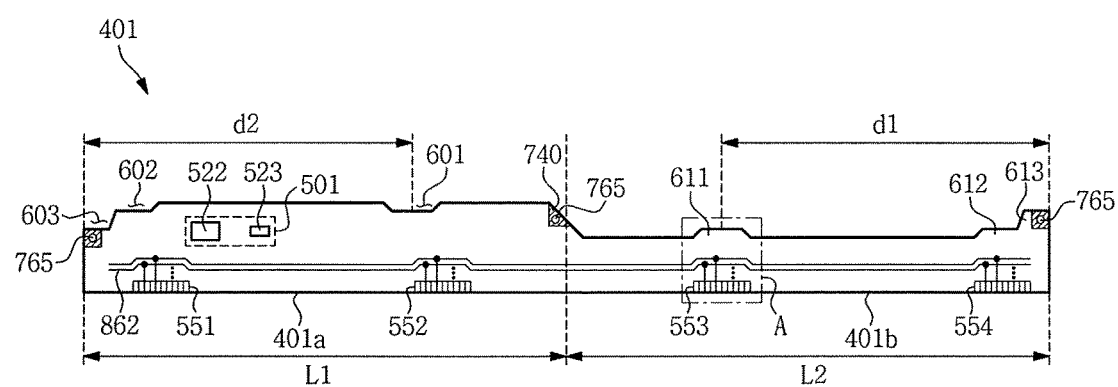
FIG. 5 is a detailed configuration view of a source printed circuit board (PCB) of FIG. 1, according to an exemplary embodiment of the present invention.

FIG. 5 is a detailed configuration view of a source PCB of FIG. 1, according to an exemplary embodiment of the present invention.

Referring to FIG. 5, the source PCB 401 may include a first substrate 401*a* and a second substrate 401*b*. In the exemplary embodiment illustrated in FIG. 5, the first and second substrates 401*a* and 401*b* may be integrally formed.

A driving circuit 501 may be disposed on the first substrate 401*a*. The driving circuit 501 may include the aforementioned timing controller 522 and the DC-DC converter 523.

The first substrate 401*a* may have an area greater than an area of the second substrate 401*b*.

A length L1 of the first substrate 401*a* may be the same as or may differ from a length L2 of the second substrate 401*b*.

The first and second substrates 401*a* and 401*b* may include a plurality of pads 551, 552, 553, and 554. Here, the plurality of pads 551, 552, 553, and 554 may be disposed on the first and second substrates 401*a* and 401*b* such that each of the first and second substrates 401*a* and 401*b* has the same number of the pads disposed thereon. For example, as illustrated in FIG. 5, under the assumption that the four pads 551, 552, 553, and 554 are disposed on the source PCB 401, the two pads 551 and 552 may be disposed on the first substrate 401*a*, and the other two pads 553 and 554 may be disposed on the second substrate 401*b*.

The second substrate 401*b* may further include a protrusion 611. The protrusion 611 may protrude to have a predetermined height at one side of the second substrate 401*b*. Here, the protrusion 611 may be disposed to correspond to the pad 553 or the miler 187. For example, the protrusion 611 may extend to have a predetermined height from a side of the second substrate 401*b* opposite to a side of the second substrate 401*b* on which the pad 553 is disposed.

In addition, the second substrate 401*b* may include a plurality of protrusions 611, 612, and 613. Here, at least two of the protrusions may have different heights. For example, as illustrated in FIG. 5, the first protrusion 611 may have a height the same as a height of the second protrusion 612 while the third protrusion 613 may have a height greater than a height of the first protrusion 611 and the second protrusion 612. Here, when the four pads 551, 552, 553, and 554 are defined as a first pad 551, a second pad 552, a third pad 553, and a fourth pad 554, respectively, in a left to right direction with reference to FIG. 5, the first protrusion 611 may be disposed to correspond to the third pad 533 and the second protrusion 612 may be disposed to correspond to the third pad 554.

The first substrate 401a may further include a groove 601. The groove 601 of the first substrate 401a may have a shape substantially the same as a shape of the protrusion 611 of the second substrate 401b. For example, in a case in which the protrusion 611 has a trapezoidal shape like that illustrated in FIG. 5, the groove 601 corresponding to the protrusion 611 may also have the trapezoidal shape. In addition, the groove 601 of the first substrate 401a may have a size substantially the same as a size of the protrusion 611 of the second substrate 401b. In other words, the groove 601 of the first substrate 401a may have a shape and a size the same as those of the protrusion 611 of the second substrate 401b. The groove 601 is indented in a side of the first substrate 401a, while the protrusion 611 is protruded out from a side of the second substrate 401b.

In addition, the first substrate 401a may include first, second, and third grooves 601, 602, and 603. Here, at least two of the grooves may have different depths. For example, as illustrated in FIG. 5, the first groove 601 may have a depth the same as a depth of the second groove 602 while the third groove 603 may have a depth greater than the depth of the first groove 601 and the second groove 602. Here, the first groove 601 may have a shape and a size substantially the same as those of the first protrusion 611, the second groove 602 may have a shape and a size substantially the same as those of the second protrusion 612, and the third groove 603 may have a shape and a size substantially the same as those of the third protrusion 613.

A distance from an end of the source PCB 401 to the protrusion 611, 612, or 613 may be the same as a distance from the other end of the source PCB 401 to the groove 601, 602 or 603. For example, a distance d1 from a right end of the source PCB 401 to a central portion of the first protrusion 611 may be the same as a distance d2 from a left end of the source PCB 401 to a central portion of the first groove 601. In addition, a distance from the right end of the source PCB 401 to a central portion of the second protrusion 612 may be the same as a distance from the left end of the source PCB 401 to a central portion of the second groove 602, and a distance from the right end of the source PCB 401 to a central portion of the third protrusion 613 may be the same as a distance from the left end of the source PCB 401 to a central portion of the third groove 603.

The source PCB 401 may include at least a fastening hole 765. The fastening hole 765 may penetrate through the source PCB 401. A ground connection portion 740 may be provided around the fastening hole 765. The fastening hole 765 may correspond to a fastening groove of the bottom case BC. The source PCB 401 may be fixed to the bottom case BC by a fastening member such as a screw being fastened to the fastening groove through the fastening hole 765. In this instance, since the fastening member comes into contact with the ground connection portion 740 and the bottom case BC, the ground connection portion 740 and the bottom case BC may be electrically connected to one another.

The fastening hole 765 may be disposed at both ends of the source PCB 401 and a central portion of the source PCB 401. In FIG. 5, an exemplary embodiment in which the fastening holes 765 are disposed at both ends of the first substrate 401a and at one end of the second substrate 401b, respectively, is illustrated.

The source PCB 401 may further include one or more signal lines 862. The signal lines 862 may be disposed on the first substrate 401a, the second substrate 401b, and the protrusions 611 and 612. At least two of the signal lines 862 may transmit the image data signals and the data control signal output from the timing controller 522 and driving voltages output from the DC-DC converter 523 to the data driving integrated circuits D-IC through respective carriers 187. In this instance, the data driving integrated circuits D-IC may receive the image data signals and the data control signal supplied thereto through input wiring patterns provided in the carrier 187. In addition, the data driving integrated circuits D-IC may output the analog image data signals through output wiring patterns provided in the carrier 187. Here, an end of each input wiring pattern may correspond to the aforementioned input terminal of the carrier 187 and an end of each output wiring pattern may correspond to the aforementioned output terminal of the carrier 187.

The other signal lines 862 aside from the at least two of the signal lines 862 may transmit the gate control signal to the gate driver 534 through auxiliary wiring patterns provided in one of the carriers 187 and auxiliary lines provided in a corner of the lower substrate 361a. The auxiliary wiring patterns may be disposed in one of the carriers 187 most adjacent to the gate driver 534. For example, the auxiliary patterns may be disposed in a leftmost carrier 187 from among the carriers 187 disposed on the source PCB 401 illustrated in FIG. 3.

Figure 6:
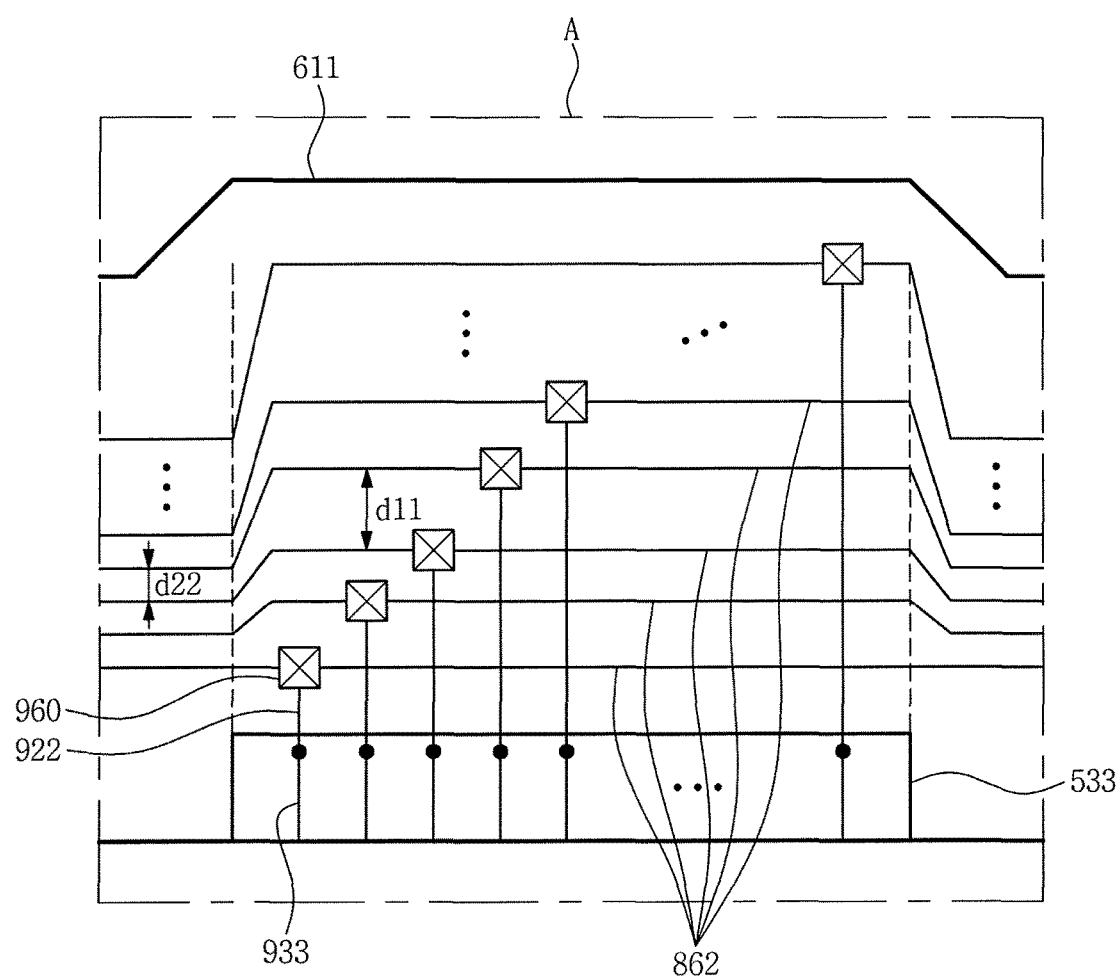
FIG. 6 is an enlarged view illustrating portion A of FIG. 5, according to an exemplary embodiment of the present invention.

FIG. 6 is an enlarged view illustrating portion A of FIG. 5, according to an exemplary embodiment of the present invention.

The signal lines 862 and the pad 533 may be electrically connected to one another by connection lines 922. In detail, since a single pad 533 includes a plurality of pad terminals 933, a single pad terminal 933 may be connected to a single signal line 862 through a single connection line 922. In addition, two or more pad terminals may be connected to a single signal line through two or more connection lines.

The pad terminals 933 and the connection lines 922 may be disposed on the same layer. The pad terminals 933 and the connection lines 922 connected to one another may be integrally formed.

The connection lines 922 and the signal lines 862 may be disposed on different layers. An insulating film may be disposed between the connection lines 922 and the signal lines 862. The insulating film may include a plurality of contact holes 960 penetrating therethrough, and thus, the connection lines 922 and the signal lines 862 may be connected to one another through the contact holes 960, respectively.

In addition, an interval d11 between the signal lines disposed in a portion of the source PCB 401 above the pads 551, 552, 553, and 554 or the carrier 187 may be greater than an interval d22 between the signal lines disposed in a portion of the source PCB 401 other than the portion of the source PCB 401 above the pads 551, 552, 553, and 554 or the carrier. The contact holes 960 may be provided in the portion of the source PCB 401 above the pads 551, 552, 553, and 554. In other words, the interval between the signal lines 862 disposed in the portion of the source PCB 401 above the pads 551, 552, 553, and 554 or the carrier may be greater than the interval between the signal lines 862 disposed in the portion of the source PCB 401 other than the portion of the source PCB 401 above the pads 551, 552, 553, and 554 or the carrier. Thus, adjacent signal lines 862 are not connected to one another through the contact holes 960. Since an area of the portion of the second substrate 401b above the pads 553 and 554 of the second substrate 401b occupied by the signal lines 862 needs to be increased in response to such an increased interval in the portion of the second substrate 401b above the pads 553 and 554 of the second substrate 401b. The protrusions 611 and 612 may increase the area of the portion of the second substrate 401b above the pads 553 and 554 to accommodate the signal lines 862 thereabove with the increased intervals.

In addition, due to the signal lines between the protrusions 611 and 612 not having to be separated by large intervals, a size of a space between the protrusions 611 and 612 may decrease. In other words, since a substantial portion of the source PCB 401 other than a portion of the source PCB 401 including elements, such as the protrusions 611 and 612 is not needed, a size of the source PCB 401 may be reduced.

Figure 7:
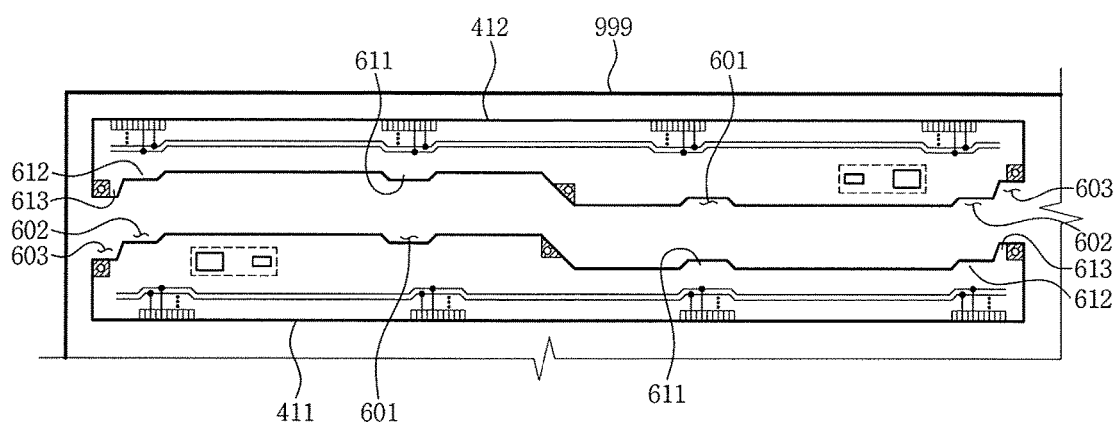
FIG. 7 is a view illustrating two source PCBs disposed on a single mother board, according to an exemplary embodiment of the present invention.

FIG. 7 is a view illustrating two source PCBs disposed on a single mother board, according to an exemplary embodiment of the present invention.

Referring to FIG. 7, first and second source PCBs 411 and 412 may be simultaneously manufactured on a single mother board 999, and may be separated from the mother board 999 through a subsequent cutting process. In this instance, the first and second source PCBs 411 and 412 formed on the mother board 999 may be symmetrical with respect to one another. For example, the first and second source PCBs 411 and 412 may have a point symmetrical relationship with respect to one another. In particular, since the first and second source PCBs 411 and 412 have the aforementioned protrusions 611, 612, and 613 and the grooves 601, 602, and 603, the protrusions 611, 612, and 613 of the first source PCB 411 may correspond to the grooves 601, 602, and 603 of the second source PCB 412, and the grooves 601, 602, and 603 of the first source PCB 411 may correspond to the protrusions 611, 612, and 613 of the second source PCB 412. Accordingly, the first and second source PCBs 411 and 412 may be relatively adjacent to one another. As a result, a total vertical width calculated by a sum of a width of the first source PCB 411, a width of the second source PCB 412, and an interval between the first and second source PCBs 411 and 412 may be reduced such that an increased number of source PCBs may be produced on the single mother board 999.

As set forth above, according to exemplary embodiments of the present invention, the source PCB may have the protrusions and the grooves. Accordingly, in the case in which a plurality of source PCBs are disposed to be symmetrical with respect to one another in a single mother board, the grooves of the source PCBs may be disposed to correspond to the protrusions of the source PCBs, respectively; thus, the source PCBs may be relatively adjacent to one another. As a result, an increased number of source PCBs may be manufactured from the single mother board.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A display device, comprising:
a display panel;
a printed circuit board (PCB) including a first substrate and a second substrate, the second substrate being unitary with the first substrate;
a driving circuit disposed on the first substrate;
a carrier connected between the display panel and a pad of the PCB and having a data driving integrated circuit mounted thereon;
a protrusion corresponding to the pad and protruding from a side of the second substrate, the second substrate being unitary with the protrusion;
and a signal line disposed at the protrusion, the first substrate, and the second substrate, the signal line for transmitting a signal from the driving circuit to the carrier,
wherein the signal line is disposed between the pad and the protrusion,
wherein the first substrate has a groove having a shape the same as a shape of the protrusion.

2. The display device of claim 1, wherein a distance from a first end of the PCB to the protrusion is the same as a distance from a second end of the PCB to the groove.

3. The display device of claim 2, wherein the first and second substrates include the same number of pads.

4. The display device of claim 2, further comprising a connecting line for connecting the signal line and the pad to one another.

5. The display device of claim 4, wherein a portion of the connecting line is disposed at the protrusion.

6. The display device of claim 2, wherein the signal line includes a plurality of signal lines, and an interval between signal lines disposed in a portion of the PCB between the pad and the protrusion is greater than an interval between signal lines disposed in a portion of the PCB other than the portion of the PCB between the pad and the protrusion.

7. The display device of claim 1, wherein the first substrate has an area greater than an area of the second substrate.

8. The display device of claim 1, wherein the first substrate has a length the same as a length of the second substrate.

9. The display device of claim 1, wherein the driving circuit includes a timing controller and a direct current (DC)-DC converter.

10. A printed circuit board (PCB), comprising:
a plurality of pads disposed on a first side of the PCB;
a plurality of protrusions and grooves disposed on a second side of the PCB, the second side of the PCB being opposite to the first side of the PCB, the PCB being unitary with the plurality of protrusions; and
a data driving circuit disposed on the PCB,
wherein a first protrusion of the plurality of protrusions is disposed opposite to a first pad of the plurality of pads, a plurality of signal lines is disposed in a first area between the first protrusion and the first pad, and the plurality of signal lines extends from the first area into a second area of the PCB where the first protrusion and the first pad are not located,
wherein a distance between adjacent signal lines in the first area is greater than a distance between adjacent signal lines in the second area,
wherein the grooves include a first groove spaced apart from the first protrusion,
wherein the first protrusion protrudes in a first direction, wherein the first groove is recessed in a second direction opposite to the first direction.

11. The PCB of claim 10, wherein the signal lines in the first area are connected to the first pad via connection lines.

12. The PCB of claim 10, wherein the plurality of signal lines are connected to the data driving circuit.

13. The PCB of claim 10, wherein the data driving circuit includes a timing controller and a direct current (DC)-DC converter.

14. A motherboard, comprising:
a first printed circuit board (PCB), the first PCB including:
a plurality of pads disposed on a first side of the first PCB; and
a plurality of protrusions and grooves disposed on a second side of the first PCB, the second side of the first PCB being opposite to the first side of the first PCB, the first PCB being unitary with the plurality of protrusions,
wherein a first protrusion of the plurality of protrusions is disposed opposite to a first pad of the plurality of pads, a plurality of signal lines is disposed in a first area between the first protrusion and the first pad, and the plurality of signal lines extends from the first area into a second area of the first PCB where the first protrusion and the first pad are not located,
wherein a distance between adjacent signal lines in the first area is greater than a distance between adjacent signal lines in the second area,
wherein the grooves include a first groove spaced apart from the first protrusion,
wherein the first protrusion protrudes in a first direction,
wherein the first groove is recessed in a second direction opposite to the first direction.

15. The motherboard of claim 14, further comprising;
a second PCB, the second PCB including:
a plurality of pads disposed on a first side of the second PCB; and
a plurality of protrusions and grooves disposed on a second side of the second PCB,
wherein the second side of the second PCB is adjacent to the second side of the first PCB, the protrusions of the first PCB correspond to the grooves of the second PCB, and the protrusions of the second PCB correspond to the grooves of the first PCB.

16. The motherboard of claim 15, wherein the first and second PCBs each include a data driving circuit.

* * * * *